United States Patent Office 3,239,489
Patented Mar. 8, 1966

3,239,489
POLY-UREA-SILAZANES AND PROCESS OF PREPARATION
Walter Fink, Ruschlikon, Zurich, Switzerland, assignor to Monsanto Company, a corporation of Delaware
No Drawing. Filed Oct. 15, 1962, Ser. No. 230,675
13 Claims. (Cl. 260—77.5)

It has been found that novel poly-urea-silazanes are obtained when certain silazanes are brought to polyaddition to di- or polyfunctional isocyanates. The qualified silazanes are polyfunctional having at least two active hydrogen atoms attached to different nitrogen atoms of the silazane. The nitrogen atoms of these silazanes are linked, besides the two active hydrogen atoms, only to silicon atoms and possibly also to boron, phosphorus, tin or other metal atoms. For most uses diisocyanates are preferred in making the polymers of the invention and if a mixture of diisocyanates is used normally it is preferred that diisocyanates are present in major amount in the mixture, i.e., more than 50% by weight.

The simplest difunctional silazane according to the definition which can be used as starting compound has the general formula $$R_3Si—NH—SiR_2—NH—SiR_3$$

In this formula the radicals R signify like or unlike aliphatic, cycloaliphatic, araliphatic, aromatic or heterocyclic radicals and/or alkoxy, cycloalkoxy, aralkoxy or aroxy radicals. Normally R has not more than 18 carbon atoms and usually not more than 8 carbon atoms. In the preparation of high-temperature resistant poly-ureasilazanes, the radicals can also contain halogen. Fluorinated lower aliphatic radicals like —CF$_3$, —CH$_2$CF$_3$, —CF$_2$CF$_3$ etc. or perfluorinated aromatic radicals like —C$_6$F$_5$ are especially suited.

The preparation of a trisilazane corresponding to the above formula in which the radicals R are CH$_3$, namely octamethyltrisilazane, has been described in the literature (U. Wannagat, H. Niederprum, Z. anorg. Chem., 308, 337 (1961)). It has been obtained by heating a compound of the type (R$_3$Si)$_2$N—SiR$_2$NH$_2$, causing a rearrangement to occur.

It has been found that analogous trisilazanes in which the R's are other hydrocarbon radicals than methyl or in which the R's are radicals of alcohols, phenols etc. or a combination of such radicals, can be prepared by analogous methods.

Also, analogous silazanes having the form of longer chains, such as tetra-, penta-, hexa-silazanes etc. or polymeric silazanes, such as [Si(NH)$_2$]$_p$, [RSi(NH)$_{1.5}$]$_p$, [R$_2$SiNH]$_p$, [HN(R)Si—R—Si(R)NH]$_p$,

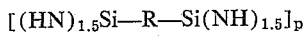

[R$_2$Si—R—Si(R$_2$)—NH]$_p$ etc. to the extent that they are capable of being produced and correspond to the definition set forth at the beginning, will also be suitable for carrying out the present invention.

In the polymeric silazanes just formulated, R again has the former significance and p represents the degree of polymerization. These compounds are obtained in a manner known essentially by heating corresponding aminosilanes. The reaction is carried out to the extent that essentially no more NH$_2$- groups are present in the desired starting products. Such starting compounds possess either exclusively Si—NH groupings, or besides these groupings, Si—N groupings are also present. The latter are generally formed on stronger and more prolonged heating of the aminosilanes.

An additional class of useful silizanes are the cyclic diorganosilazanes. The cyclic diorganosilazanes serving as starting compounds are especially the well known trimeric and tetrameric diorganosilazanes. They can easily be obtained from diorganosilicon halides and ammonia by using conventional methods giving quantitative yields. They possess one of the following formulae

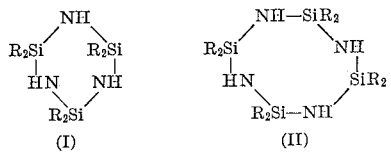

In these formulae R is as described hereinabove, preferably aliphatic, cycloaliphatic, araliphatic, aromatic or heterocyclic radicals, so far as they may occur in such compounds. These radicals may be unsaturated or contain substituents. Moreover, both radicals being on the same silicon atoms may be different from one another.

In the literature are reported compounds of type (I), in which either all of the R are alike, namely methyl, ethyl, n-butyl or phenyl, or in which both radicals on the same silicon atoms are different, namely methyl/ethyl or methyl/phenyl.

Compounds of type (II) have been known up to now in R=methyl or ethyl.

But there is no doubt that by using the same methods which lead to these known compounds, a great number of novel, similarly made hexaorganocyclotrisilazanes and octaorganocyclotetrasilazanes can be prepared and reacted in the manner as described below with multivalent isocyanates in order to get the polyureasilazanes of the invention. A certain limitation of the starting compounds seems to depend only on the fact that probably no cyclosilazanes can be prepared, in which R is a stereometrically voluminous group such as, for example tertiary butyl or 1-naphthyl. Of course, in addition to these generally available 6- and 8-membered cyclosilazanes, smaller, e.g., four-membered rings, and bigger rings, so far as these are available, will also be suitable to put the present invention into practice.

Now, it has been found that by reacting a cyclosilazane with, for example, a diisocyanate in molar ratio corresponding to the imino groups present, i.e., 1:1.5 with compounds of type (I) and 1:2 with compounds of type (II), the expected polymers are not formed, having connected 6- or 8-membered silazane rings, which should have the following formulae

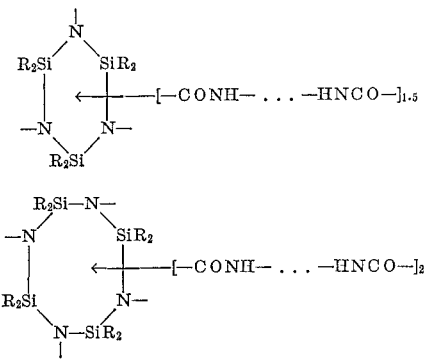

Extensive experiments with phenylisocyanate as a model-compound have shown that the trimeric and tetrameric diorganocyclosilazanes used in the reaction are completely cleaved and simultaneously novel rings are formed which, depending on the proportion of the reactants used, may be 4-membered, 6-membered or even higher-membered rings and have not been known up to now.

Thus, in this reaction not just 1 mole of isocyanate for each NH-group is used as originally assumed but 2 moles of isocyanate for each NH-group which is present.

In the reaction of a silazane at least 2 isocyanate groups react for each NH-group in order to obtain uniform polymers in quantitative yields.

Silyl groups, instead of hydrogen atoms, may replace part of the hydrogen atoms on the nitrogen atoms of the Compounds I and II. These silyl groups have the formula —$SiR_3$, wherein R is defined as before. Thus one silyl group can be present on the Compound I and up to two silyl groups on the Compound II. In the preparation of these starting compounds which have not been known until now, first the mono- or di-alkali salt or Grignard derivative is formed by methods known, and then, it is brought to reaction with a triply organically substituted silicon halide. Suitable silicon halides are, for example, trimethyl-, triethyl-, tripropyl-, tributyl-, trioctyl-, trilauryl-, tribenzyl-, tricyclohexyl-, triphenyl-, tritolyl-, trinaphtyl-silicon chloride, -bromide, -fluoride etc. The hydrocarbon radicals may again contain substituents, especially fluorine atoms; other suitable halides are trimethoxy-, triethoxy-, triphenoxy-silicon chloride, -bromide, -fluoride, etc., or silicon halides which possess a combination of the enumerated radicals.

A variation of the starting products (I) and (II) rests on the introduction of corresponding boron-, phosphorus-, tin- or other appropriate metal-containing groups instead of silicon-containing groups. Examples thereof are —$PR_2$, —$BR_2$, —$SnR_3$, —$P(O)R_2$, —$P(S)R_2$, etc., with the R's being defined again as before.

It is in the scope of this invention also to use starting compounds which consist of two or more cyclosilazanes linked together. The ring connection is preferably done through the silicon atoms. For this purpose, for example, the monolithium salt of the Compound I or II is reacted with $R_2SiCl_2$. It is obvious that suitable starting compounds can also be obtained, if, for example, two cyclosilazanes are connected, each of which contains only one active hydrogen atom.

A variation of the starting products containing two or more connected cyclosilazanes is based on the ring linkage by boron, phosphorus, tin or other appropriate metal atom. For this purpose, for example, the mono-lithium salt or Grignard derivative of the Compound I or II is reacted with $RBCl_2$, $RPCl_2$, $RP(S)Cl_2$, $RP(O)Cl_2$, $RSnCl_3$, $R_2SnCl_2$, etc.

Still a further class of suitable starting compounds possess the general formula $$R'R_2Si—NH—SiR_2—NH—SiR_2R'$$

In this formula R has again the significance mentioned before and R' is preferably a siloxy or siloxanoxy group —$O(SiR_2O)_nSiR_3$, wherein n stands for zero or an integer up to 10. Such siloxy or siloxanoxy group-containing trisilazanes have not previously been known. It has been found that by heating a cyclic, preferably trimeric di-organosilazane with a silanol $HOSiR_3$ or siloxanol $HO(SiR_2O)_nSiR_3$, the above formulated compounds are formed. The preparation is simply effected by heating the reactants until no more ammonia is evolved. The reaction occurs with, for example, a hexaorganocyclotrisilazane and a triorganosilanol according to the following scheme:

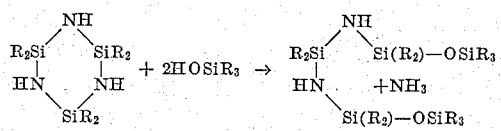

Instead of a silanol an analogous boron compound $HOBR_2$ or tin compound $HOSnR_3$ can be reacted in exactly the same manner.

A great number of multivalent isocyanates are known which are fit for the present reaction. They correspond to the general formula $$R''(NCO)_n$$

wherein n is an integer of at least 2 and R'' is an organic radical of the valence n. R'' normally will not contain more than 24 carbon atoms. All types of di- and poly-functional isocyanates of the aliphatic, hydroaromatic and aromatic range can be added to cyclosilazanes to give the polymers of invention. Examples are 1,2-diisocyanato-ethane, 1,3-diisocyanatopropane, 1,4-diisocyanatobutane, diisocyanatoethylethane, diisocyanatophenylethane, 1,6-diisocyanatohexane, 1,8-diisocyanatooctane, 1,4-diisocyanatocyclohexane, 1,3-diisocyanatocyclohexane, 4,4'-diisocyanatodicyclohexylmethane, 1,4-diisocyanatobenzene, 1-chloro-2,4-diisocyanatobenzene, 2,4- and 2,6-diisocyanatotoluene and the commercial mixture 65:35 thereof, 4,4'-diisocyanatodiphenylmethane, 3,3'-dimethoxy-4,4'-diisocyanatodiphenyl, 1,5- and 1,8-diisocyanatonaphthalene. Further, trimerisation products of diisocyanates which still contain two or several free isocyanate groups. They can be prepared by, for example, the catalytic influence of phosphines upon corresponding isocyanates. Especially suitable mixtures of diisocyanates are those known commercially as "Crude MDI" which contain about 60% of 4,4'-diphenylmethane-diisocyanate along with other isomeric and analogous polyisocyanates such as 4,4',4''-triisocyanato-triphenylmethane and

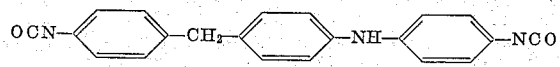

Mixtures such as "Crude MDI" can be made by methods described in U.S. 2,683,730.

Also in question come diisocyanates with hydrocarbon radicals which are linked through heteroatoms or hetero-atom groups like S, $(CH_2)_3S(CH_2)_3$, $S_2SO_2SO_2NH$, $SO_2NHCH_2CH_2NHSO_2$, CO, $CO_2NH$, N=N, $$OCH_2CH_2O$$

etc.

Triisocyanates and polyisocyanates can similarly be used. Examples are 4,4',4''-triisocyanatotriphenylmethane, 1-methyl-4,6,4'-triisocyanatodiphenylmethane, the reaction product of 1 mole of trimethylolpropane and 3 moles of diisocyanatotoluene, polymeric isocyanatophenylmethylene, polymers obtained by reaction of oxygen and hexamethylene diisocyanates etc. The multivalent isocyanates which can be used here may also contains unsaturated radicals, such as, e.g., 4,4'-diisocyanatostilbene. Other unsaturated diisocyanates can be prepared by, for example, reaction of 2 moles of diisocyanatotoluene and 1 mole of an unsaturated diol, such as, e.g., 1,4-butenediol, 1,4-butinediol etc.

With triisocyanates or polyisocyanates the corresponding crosslinked polymers will be formed. Using the reactants in a molar proportion of at least 1:4.5, or 1:6 respectively, crosslinked structure units having six- or higher-membered rings seems likely in the polymers which are formed at temperatures of about 120–200° C.

The ideal reaction proportions comprise at least 2 isocyanate groups and not more than 6 isocyanate groups per imine group of the cyclosilazane to be reacted.

In carrying out the addition reaction, the reactants are mixed and, if necessary, heated, until a substantial combination, i.e., a linkage between the carbonyl carbon atoms and the nitrogen atoms is achieved. One can work with or without a solvent. Although the isocyanates are known to be reactive compounds, aromatic much more so than aliphatic, sometimes it can be advantageous to accelerate the reaction speed by using catalysts, since the Si-NH-Si groups concerned do not react as easily as common primary amines. Suitable catalysts are basic compounds, such as pyridine, methylpiperidine, dimethylpiperazine, hexahydrodimethylaniline, tributylphosphine, alkali hydroxides, alkaline earth hydroxides, tin hydrides etc. In certain cases it can also be convenient to add small amounts of reaction inhibiting acid agents, such as, e.g., HCl, $PCl_5$, carboxylic chlorides, cyanoacetic esters, thioureas etc. and to employ a higher reaction temperature.

In order to separate the lower molecular weight, probably cyclic products which are often formed simultaneously when less than 3 isocyanate groups per imine group of the cyclosilazane are used, the reaction can be carried out in a solvent, like n-hexane, in which only the polymeric products are insoluble. Or the polymeric products are precipitated from their solution in, e.g., benzene by adding n-hexane.

The novel polymers can contain as additives other constituents, such as powdered wood, asbestos, glass fibers, metal fibers, pigments etc., thereby their mechanical properties will be modified. From resins which are not yet entirely polymerized, materials to be pressed can be prepared which can be molded in the cold and cured without pressure in the furnace.

Depending on their structure and the organic radicals present, the poly-urea-silazanes of the invention are liquid, fat-like, wax-like, gum-like or hard substances. At least after polymerizing at temperatures above about 100° C. they are insoluble in water and common organic solvents and show a considerable resistance against acids, bases and high temperatures. The speed of the reaction depends on the kind of both reactants and, of course, on the reaction step. Silazanes which have negative substituents, such as phenyl, trifluoromethyl etc. attached to the silicon atom, do not react as easily as, for example, the aliphatically substituted silazanes. It is also true that the aliphatic isocyanates add less fast than aromatic isocyanates. While a mixture of, for example, hexamethylcyclotrisilazane and 2,4-diisocyanatotoluene reacts strongly exothermically at room temperature, a mixture of hexaphenylcyclotrisilazane and hexamethylene diisocyanate can be stored at room temperature for a longer time. Thus, the reaction temperature as well as the reaction time can be very different from case to case. The reaction mixture is expediently pre-polymerized at first at low temperatures, e.g., 20–80° C. and subsequently polymerized at higher temperatures, e.g. 120–200° C.

The molecular weights of the desired polymers can be varied by conventional methods, for example by using pure starting materials, inhibitors, catalysts, by increasing the time of staying in dissolved state, by removing the heat of reaction from the melt, by concomitant use of monofunctional, i.e., chain-stopping components, such as monovalent isocyanates, amines, water, alcohols, carboxylic acids, ureas, phenols, active methylene groups, mercaptans, carboxylic acid amines, sulfonic acid amides, oximes, formaldehyde, hydrocyanic acid and so on.

The polymers which are composed of purely aromatic isocyanates and of such silazanes which contain as substituents $CH_2CX_3$ or $C_6X_5$ (X=Cl or F) are especially resistant. The hard types of polyureasilazanes are casting resins which are workable by using cutting machines, or the addition polymerization has to be carried out during the fabrication. When the reaction is carried out at higher temperatures in a solvent, such as, e.g., toluene, the end product can be obtained as a fine powder.

A further object of the invention is the manufacture of foamed products which are based on the polymers of invention. The foamed polymers can be prepared in known manner by addition of blowing agents like azobis-isobutyronitrile. An evolution of gas in the polymerizing mass can also be achieved with excess of isocyanate and addition of carboxylic acids or water.

Still further objects of this invention is the use of the polyureasilazanes in the preparation of coatings, films, inmpegnations and so on. For this purpose a mixture of the starting reactants is applied to a substratum and subjected, if necessary, to such temperatures, as the formation of higher polymerized, possibly crosslinked synthetic composition coatings is achieved. For this purpose, the reactants can be employed in a solvent which is inert towards the isocyanate and the silazane, such as benzene, toluene, tetrahydrofuran etc. A solution of the isocyanate and a solution of the silazane in the right proportion can be sprayed simultaneously by means of two synchronously working spray guns, thereby the two liquid jets combine for or on the object to be coated. The thus applied coatings can be cured at higher temperatures, if necessary, after the solvent has been evaporated. However, mixtures ready for the use can be prepared which are more or less stable. For this purpose, stabilizers are added and/or there are used such multivalent isocyanates which are less reactive. As mentioned before, the addition proceeds in several steps. A certain part of the isocyanate necessary for the complete polymerization can be reacted so that the resulting polymerizate is still soluble or liquid and therefore will remain applicable. In order to achieve this, either mixtures of such isocyanates are used which display a different reactivity, like, e.g., aromatic and aliphatic types, or isocyanates are used which possess in their molecule two of such different strongly reacting isocyanate groups, like, e.g., 4,4'-diisocyanatohexahydrodiphenyl, isocyanatoethyl-5-isocyanatobenzene etc. The ultimate, less easily proceeding additions between the slower reacting isocyanate groups and the fragments of silazanes can then be forced after the application by the influence of heat and/or catalysts, whereupon insoluble and infusible lacquers or impregnations, respectively, are formed.

The expert will recognize that when the polyaddition is carried out at higher temperatures, instead of multivalent isocyanates also such compounds which are able of releasing isocyanates at these temperatures can also be used in all processes of invention. Such compounds are for example, the adducts with phenol, phenylmethylpyrazolon, diphenylamine, oximes, caprolactam, malonic acid esters, acetacetic acid esters, acetylacetone etc., thereby these foreign agents can serve as a catalyst or can be further useful as a plasticizer or a stabilizer after the cleavage.

Under these circumstances low boiling alcohols can even be used as solvents for the partly polymerized, i.e., no more than 8- or 6-membered ring-containing reaction components, since the evaporation will be accomplished before the formation of isocyanate through cleavage will occur.

Some of the polymers of invention can be baked on their support at very low temperatures. Therefore, they are excellently suited for lacquers and impregnations of substrates which are decomposed by heat, such as paper, textiles, leather, plastics, wood, etc. They are also suited for coating glass, metals, rubber, etc.

Because the polyureasilazanes possess no mobile hydrogen atoms, which is the reason for the electrical conductance, they show a high electrical resistance and therefore are preferably suitable for the insulation of wires, for the impregnation of rotors etc.

The varnishes made from polyureasilazanes have an excellent adhesion and can also be used for cementing different kinds of materials. They are resistent against water, organic solvents, acids, alkalis and heat.

Depending on the number and position of the reactive hydrogen atoms and isocyanate groups, linear as well as cross-linked polymers can be prepared. The molcular weights can be varied within large limits by addition of determined amounts of a mono-function reactant, i.e., a silazane having only one reactive hydrogen atom, and/or a monoisocyanate.

*Example 1*

6.0 g. (0.025 mole) of octamethyltrisilazane and 4.47 g. (0.025 mole) of toluenediisocyanate (technical grade) in 70 ml. n-hexane are reacted with vigorous stirring under exclusion of moisture at 50° C. The reaction starts immediately.

The mixture becomes slightly warm and the polymer which is insoluble in n-hexane precipitates. After the reaction is completed (2–3 hours) the polymer is filtered off and dried to a constant weight at 30°/0.1 mm. Yield: 8.3 g. (=80% of the theory)

The product is dissolved in boiling benzene and again precipitated by n-hexane and dried. Yield: 7.35 g. (=70% of the theory); white polymer; sintering point 281–85° C.; decomposition point 289–310° C. Now, the polymer is not soluble in benzene and also not soluble in the organic solvents bromoforme, nitrobenzene, n-hexane, cyclohexane, ethylene-bromide, ethylbromide, carbon tetrachloride, acetone, methylethylketone, dioxane or diethylether; whereas, in dimethylformamide it is soluble.

*Analysis.*—Calculated, percent: C, 49.94; H, 7.89; N, 13.71; Si, 20.62. Found, percent: C, 51.32; H, 7.49, N, 14.01; Si, 20.02.

About the same yields are obtained when the reaction is carried out at temperatures in the range of 20–80° C.

Example 2

A mixture of 4 g. (0.017 mole) of octamethyltrisilazane and 3.98 g. (0.017 mole) of toluene-diisocyanate (technical grade) is left standing under exclusion of moisture. Soon an exothermic reaction starts, and the mixture warms up to 60–70° C. The mixture polymerizes to a colorless, completely clear and transparent mass. The reaction is completed by further heating at 50–60° C. for 8 hours.

The poly-urea-silazane obtained shows a sintering point of 160°–70° C. and is, as opposed to the compound of Example 1, soluble in acetone, dioxane, benzene, etc. After a short time, however, it is precipitated from these solvents because it becomes insoluble. Then, it has the properties of the poly-urea-silazane described in Example 1.

*Analysis.*—Calculated, percent: C, 49.94; H, 7.89; N, 13.71; Si, 20.62. Found, percent: C, 50.47; H, 7.78; N, 14.23; Si, 20.32.

Example 3

First of all, the silazoxane is prepared. Hexamethylcyclotrisilazane [—$(CH_3)_2$Si—NH—]$_3$ and trimethylsilanol OHSi$(CH_3)_3$ in a molar ratio of 1:2 are heated at 140° C. for 5 hours. Based on the ammonia which is evolved, the conversion is 100%. The product is isolated by distillation in vacuum. Boiling point 116–6.5° C./8 mm.

*Analysis.*—$C_{12}H_{36}O_2N_2Si_5$: Calculated, N, 7.31%; molecular weight 383. Found, N, 7.3%; molecular weight 418.

5.55 g. (0.0145 mole) of this silazoxane are dissolved in 17 ml. of n-hexane and there is added a solution of 2.53 g. (0.0145 mole) of toluenediisocyanate (technical grade) in 8 ml. n-hexane at 25° C. The reaction is completed by warming at 50–60° C. for 8 hours, and the polymer precipitates. It is washed with n-hexane and dried to a constant weight at 30° C./0.1 mm. Yield: 7.8 g. (=96.9% of the theory); softening point 100–110° C.; decomposition point 245–55° C. The polymer is soluble in dimethylformamide and insoluble in most of the common solvents.

*Analysis.*—Calculated, percent: C, 45.27; H, 7.96; N, 10.01; Si, 25.27. Found, percent: C, 47.88; H, 7.55; N, 10.01; Si, 25.63.

Example 4

5 g. (0.023 mole) of hexamethylcyclotrisilazane and 6.1 g. (0.035 mole) of toluenediisocyanate (technical grade) are reacted in 25 ml. n-hexane at 25° C. The mixture is worked up as described in Example 3. Yield: 10.5 g. (=94.5% of the theory); softening point 200–10° C.; decomposition point 300–40° C.; soluble in dimethylformamide, insoluble in most of the common solvents.

*Analysis.*—Calculated, percent: C, 45.27; H, 7.96; N, 10.01. Found, percent: C, 47.88; H, 7.55; N, 10.01.

On treatment with 20–30% sulfuric acid in boiling methanol, the poly-urea-silazane is not altered.

Example 5

5.85 g. (0.023 mole) of octamethylcyclotetrasilazane and 7.96 g. (0.045 mole) of toluenediisocyanate are reacted in 30 ml. of n-hexane. For the purification, the polymer obtained is reprecipitated in benzene by n-hexane and worked up as described in Example 3. Yield: 12.0 g. (=94% of the theory); decomposition point 240–50° C.; soluble in dimethylformamide, insoluble in most of the common organic solvents.

*Analysis.*—Calculated, percent: C, 49.65; H, 6.17; N, 17.15; Si, 17.20. Found, percent: C, 50.57; H, 6.44; N, 16.18; Si, 17.67.

Example 6

44 parts by weight of hexamethylcyclotrisilazane and 100 parts by weight of hexamethylenediisocyanate (molar ratio 1:3) are mixed and kept at 80° for 25–30 minutes, care being taken that the temperature does not rise higher because of the heat of reaction. The soft polymer obtained is a highly elastic transparent mass which does not change by pressing with 1000 atmospheres in a closed mold.

When the polymer is heated at 120–160° for some time it is converted to a hard elastic mass, which is insoluble in common organic solvents and water.

When simultaneously to the starting mixture mentioned above 1–5 parts by weight of 2,4-diisocyanatotoluene are added the polymerization proceeds substantially faster.

When simultaneously to the starting mixture mentioned above 200 parts by weight of powdered asbestos are added, one obtains a mass which does not substantially change its form and strength on heating at 350° for 5 hours.

Example 7

21.9 parts by weight of hexamethylcyclotrisilazane and 50.4 parts by weight of 2,4-diisocyanatotoluene are well mixed, whereupon a strongly exothermic reaction set in which can be controlled by cooling. The reaction mixture becomes a soft sticky resin.

On heating at 120–160° for some time, a hard pulverable mass is formed.

When the starting mixture mentioned above is reacted in 200 ml. of toluene, the whole reaction mixture solidifies and becomes a transparent jelly.

When the starting mixture mentioned above is reacted in 200 ml. of boiling toluene, the polymer precipitates in form of a white powder.

Example 8

29.2 parts by weight of octamethylcyclotetrasilazane and 21.9 parts by weight of hexamethylcyclotrisilazane are reacted with 118 parts by weight of hexamethylenediisocyanate as described in Example 6. The polymer, which is formed, has exactly the same composition as that of Example 6. However, it is somewhat less transparent.

Example 9

In a series of experiments, solutions of 2.19 g. of hexamethylcyclotrisilazane and of the necessary quantity of toluene-2,4-diisocyanate (B.P. 121–122° C./12 mm.) to give the molar ratio indicated in Table 1, are refluxed for 5 hours in 100 ml. of xylene (B.P. 137–143° C.). Then, 2000 ml. of hexane are added, the solution cooled to 0° C., the precipitated polymer filtered off and dried at 50° C. in vacuum until its weight remains constant.

TABLE 1.—DETERMINATION OF THE YIELDS IN THE REACTION OF HEXAMETHYLCYCLOTRISILAZANE (HMCTS) AND TOLUENE-2,4-DIISOCYANATE (TDI)

| Ratio, HMCTS:TDI | HMCTS, g. | TDI, g. | Yield* | |
|---|---|---|---|---|
| | | | G. | Percent |
| 1:2.0 | 2.19 | 3.48 | 4.62 | 81.5 |
| 1:3.0 | 2.19 | 5.21 | 7.31 | 99.0 |
| 1:3.5 | 2.19 | 6.09 | 6.89 | 83.5 |
| 1:4.0 | 2.19 | 6.95 | 6.32 | 69.3 |
| 1:5.0 | 2.19 | 8.71 | 7.03 | 64.3 |
| 1:6.0 | 2.19 | 10.44 | 7.31 | 58.1 |
| 1:8.0 | 2.19 | 13.90 | 7.51 | 46.8 |
| 1:10.0 | 2.19 | 17.40 | 7.28 | 37.3 |

*The yields are calculated on the total weight of the reactants put in the reaction.

The products obtained by using the reactants in molar ratios of 1:1 and 1:2 are unstable at room temperature. But on heating at 140–160° C. a stable polymer is formed among other products.

When in the reaction the reactants are present in a molar ratio of 1:3, they are totally recovered in form of a polymer.

Using an excess of toluene diisocyanate corresponding to a molar ratio of 1:3.5 or more, the excess is practically not consumed under the condition of working, i.e., in refluxing xylene, as specified in Example 4. However, some crosslinking may occur, since the viscosity of the polymer in solution is increased.

On working at higher temperatures, for example, on heating at 160–200° C. without a solvent or in, e.g., decalin, excess of any diisocyanate up to a molar ratio of 1:9 is chemically bound in the resulting polymer or in fragments formed thereof.

The polymer which is obtained by using a molar ratio of 1:4.5 is stable up to more than 200° C., and upon heating, apart from some end-groups, no evidence of free isocyanate groups is found by infrared analysis. The cured polymer now is highly crosslinked and insoluble in organic solvents and water and stable towards alkali and acids.

*Example 10*

In another competitive series of experiments, solutions of 2.92 g. of octamethylcyclotetrasilazane and of the necessary quantity of toluene-2,4-diisocyanate (B.P. 121–122° C./12 mm.) to give the molar ratio indicated in Table 2, are refluxed for 5 hours in 100 ml. of toluene (B.P. 110° C.). Then, 2000 ml. of hexane are added, the solution cooled to 0° C., the precipitated polymer filtered off and dried at 50° C. in vacuum until its weight remains constant.

TABLE 2.—DETERMINATION OF THE YIELDS IN THE REACTION OF OCTAMETHYLCYCLOTETRASILAZANE (OMCTS) AND TOLUENE-2,4-DIISOCYANATE (TDI).

| Ratio, OMCTS:TDI | OMCTS, g. | TDI, g. | Yield* | |
|---|---|---|---|---|
| | | | G. | Percent |
| 1:1.0 | 2.92 | 1.74 | 2.12 | 45.6 |
| 1:2.0 | 2.92 | 3.48 | 4.25 | 66.3 |
| 1:3.0 | 2.92 | 5.21 | 6.38 | 89.0 |
| 1:4.0 | 2.92 | 6.95 | 9.80 | 99.5 |
| 1:5.0 | 2.92 | 8.71 | 9.42 | 81.0 |
| 1:6.0 | 2.92 | 10.44 | 9.65 | 72.5 |
| 1:8.0 | 2.92 | 13.90 | 9.82 | 58.4 |
| 1:10.0 | 2.92 | 17.40 | 9.78 | 42.2 |

*The yields are calculated on the total weight of the reactants put in the reaction.

The products obtained by using the reactants in molar ratios of 1:1 to 1:3 are unstable at room temperature. On heating a stable polymer is formed among other products.

When in the reaction the reactants are present in a molar ratio of 1:4, they are totally recovered in form of a polymer.

The same is true as in Example 4 if an excess of any diisocyanate is put in the reaction. However, owing to the increased number of imino-groups in the starting cyclotetrasilazane, a heat-resistant product is obtained by using the reactants in a molar ratio of 1:6 up to 1:12.

*Example 11*

In still another series of experiments, mixtures of 1.46 g. of hexamethylcyclotrisilazane and the necessary quantity of hexamethylenediisocyanate (B.P. 81° C./0.1 mm.) to give the molar ratio indicated in Table 3, are heated without a solvent at 120° C. for 3 hours. Then, the polymers obtained are directly heated at 160° C. for 4 hours—in another series for 22 hours—and the decrease in weight is observed. Since no isocyanate but silicon- and nitrogen-containing compounds are only released on decomposition of the polymers, the decrease in weight has been calculated as a supposed decrease of hexamethylcyclotrisilazane in order to determine the proportions hexamethylcyclotrisilazane:hexamethylenediisocyanate used in the formation of the cured polymer.

TABLE 3.—DECREASE IN WEIGHT OF THE POLYMERS FORMED WITH HEXAMETHYLCYCLOTRISILAZANE (HMCTS) AND HEXAMETHYLENEDIISOCYANATE (HDI)

| Ratio, HMCTS:HDI | HMCTS, g. | HDI, g. | Percent Decrease in Weight* after Heating for— | | Ratio, HMCTS:HDI after Heating for 22 hours |
|---|---|---|---|---|---|
| | | | 4 h. | 22 h. | |
| 1:2.0 | 1.46 | 2.24 | 17.86 | 22.47 | 1:4.65 |
| 1:2.5 | 1.46 | 2.80 | 13.37 | 15.15 | 1:4.46 |
| 1:3.0 | 1.46 | 3.36 | 6.93 | 10.52 | 1:4.63 |
| 1:3.5 | 1.46 | 3.92 | 1.87 | 5.95 | 1:4.49 |
| 1:4.0 | 1.46 | 4.48 | 0.11 | 2.50 | 1:4.50 |
| 1:4.5 | 1.46 | 5.04 | 0.00 | 0.00 | 1:4.50 |
| 1:5.0 | 1.46 | 5.60 | 0.00 | 0.00 | 1:5.0 |

*The decreases in weight are calculated on the total weight of the reactants.

It becomes apparent that polymers stable at 160° C. are formed when the ratio of the reactants, i.e., optional hexaorganocyclotrisilazanes and organic diisocyanates, is at least 1:4.5. However, this ratio should not be greater than 1:9, or, if an octaorganocyclotetrasilazane is engaged, not greater than 1:12.

It is obvious to those skilled in the art that by using a tri- or polyisocyanate the amount of the isocyanate has correspondingly to be decreased according to the available reactive isocyanate groups.

*Example 12*

A mixture of 53 g. (0.21 mole) of 4,4′-diphenylmethane diisocyanate and 15.3 g. (0.07 mole) of hexamethylcyclotrisilazane is stirred in 100 ml. of xylene. After some time the mixture becomes viscous and finally solidifies. Upon standing for 3 days most of the xylene is evaporated. The remaining is dried at 60–90°/1 mm. The resulting polymer is a white hard mass. It is insoluble in common organic solvents and water and possesses a good resistance towards alkali and acids. It shows an excellent impact strength.

By using convenient blowing agent, such as azo-bis-isobutyronitrile, a foamed polymer is obtained displaying the same properties.

What is claimed is:

1. A process for preparing poly-urea-silazanes comprising reacting a polyimino silazane selected from silazanes of the formulas $R_3Si-NH-SiR_2-NH-SiR_3$,
$[Si(NH)_2]_p$,
$[RSi(NH)_{1.5}]_p$,
$[R_2SiNH]_p$,
$[HN(R)Si-R-Si(R)NH]_p$,
$[(HN)_{1.5}Si-R-Si(NH)_{1.5}]_p$,
$[R_2Si-R-Si(R_2)-NH]_p$, cyclic diorganosilazanes of the formulas $(R_2SiNH)_m$, $R'R_2Si-NH-SiR_2-NH-SiR_2R'$ or mixtures thereof wherein R is an organic group, $p$ represents the degree of polymerization, $m$ is 2, 3 or 4, and R' is $-O(SiR_2O)_nSiR_3$ where $n$ is 0 or an integer up to 10 with an organic polyisocyanate.

2. A process of claim 1 wherein the reaction is carried out at temperatures in the range of about 20°–80° C. for a time sufficient to form a prepolymer which is soluble in benzene and which is capable of being further polymerized especially at temperatures above 100° C.

3. A process of claim 2 wherein the reaction is continued at temperatures in the range of 120°–200° C. for a time sufficient to form a polymer product which is substantially insoluble at room temperature in benzene.

4. A process of claim 1 wherein said silazane comprises in major amount at least one silazane selected from the group consisting of octamethyltrisilazane, octamethylcyclotetrasilazane, hexamethylcyclotrisilazane and $Si(CH_3)_3OSi(CH_3)_2$,
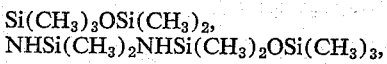
$NHSi(CH_3)_2NHSi(CH_3)_2OSi(CH_3)_3$, and said isocyanate comprises in major amount at least one isocyanate selected from the group consisting of toluenediisocyanates, hexamethylenediisocyanate and 4,4'-diphenylmethane diisocyanate.

5. A process of claim 4 wherein said isocyanate present in major amount is 4,4'-diphenylmethanediisocyanate and a minor amount of 4,4',4''-triisocyanatotriphenylmethane is mixed therewith.

6. A process of claim 4 wherein said isocyanate present in major amount is 2,4-diisocyanatotoluene and a minor amount of 2,6-diisocyanatotoluene is mixed therewith.

7. A mixture inhibited against polymerization at room temperature comprising a polyimino silazane selected from silazanes of the formulas $R_3Si-NH-SiR_2-NH-SiR_3$,
$[Si(NH)_2]_p$,
$[RSi(NH)_{1.5}]_p$,
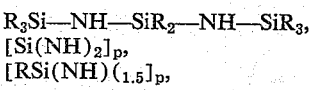
$[R_2SiNH]_p$,
$[HN(R)Si-R-Si(R)NH]_p$,
$[(HN)_{1.5}Si-R-Si(NH)_{1.5}]_p$,
$[R_2Si-R-Si(R_2)-NH]_p$, cyclic diorganosilazanes of the formula $(R_2SiNH)_m$, $R'R_2Si-NH-SiR_2-NH-SiR_2-NH-SiR_2R'$ or mixtures thereof wherein R is an organic group, $p$ represents the degree of polymerization, $m$ is 2, 3 or 4, and R' is $-O(SiR_2O)_nSiR_3$ where $n$ is 0 or an integer up to 10 and an organic polyisocyanate with the relative amounts of the silazane and isocyanate being such that the mixture has at least about two isocyanate groups per imino group in the silazane, and an amount sufficient to inhibit polymerization of a reaction inhibiting acid agent.

8. A poly-urea-silazane product of the process of claim 1.

9. A poly-urea-silazane product of the process of claim 2.

10. A poly-urea-silazane product of the process of claim 3.

11. A poly-urea-silazane product of the process of claim 4.

12. A poly-urea-silazane product of the process of claim 5.

13. A poly-urea-silazane product of the process of claim 6.

References Cited by the Examiner

UNITED STATES PATENTS

| | | | |
|---|---|---|---|
| 2,527,590 | 10/1950 | Speier | 260—77.5 |
| 2,885,370 | 5/1959 | Groszos et al. | 260—2 |
| 2,907,782 | 10/1959 | Pike | 260—448.2 |
| 3,172,874 | 3/1965 | Klebe | 260—77.5 |

OTHER REFERENCES

Rochow, "Chemistry of the Silicones," 2nd edition (1951), pages 74–75.

LEON J. BERCOVITZ, *Primary Examiner.*